April 10, 1928.  
L. NYCZ  
1,665,974

AUTOMOBILE

Filed Oct. 26, 1926  2 Sheets-Sheet 1

INVENTOR
Louis Nycz
BY
J. N. Gilbert
ATTORNEY.

April 10, 1928.

L. NYCZ 1,665,974

AUTOMOBILE

Filed Oct. 26, 1926

INVENTOR
Louis Nycz
BY
F. N. Gilbert
ATTORNEY

Patented Apr. 10, 1928.

1,665,974

UNITED STATES PATENT OFFICE.

LOUIS NYCZ, OF BINGHAMTON, NEW YORK.

AUTOMOBILE.

Application filed October 26, 1926. Serial No. 144,373.

My invention relates to improvements in automobile vehicles particularly to the power transmissive means employed in such vehicles.

One object of my invention is to provide improved means for generating and transmitting power in automobiles with greater control of these elements on the part of the operator.

With these objects in view, my invention consists in certain novel features of construction and arrangement of parts, as will be hereinafter described and pointed out in the claim. Reference being had to the accompanying drawings in which:

The same reference characters denote like parts in each of the several figures of the drawings.

Figure 1:
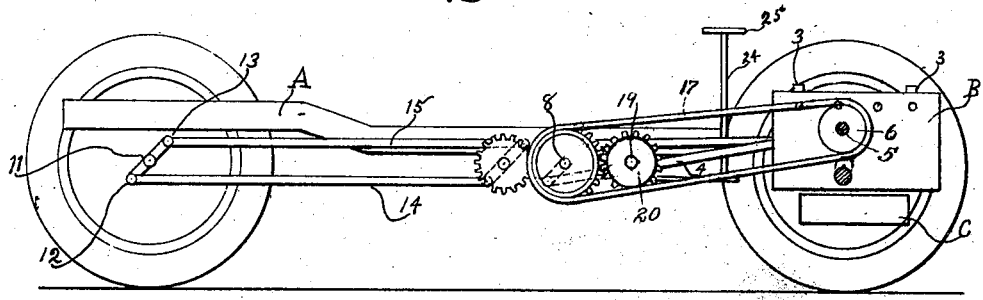
Fig. 1, is a side view of my device.
Figure 2:
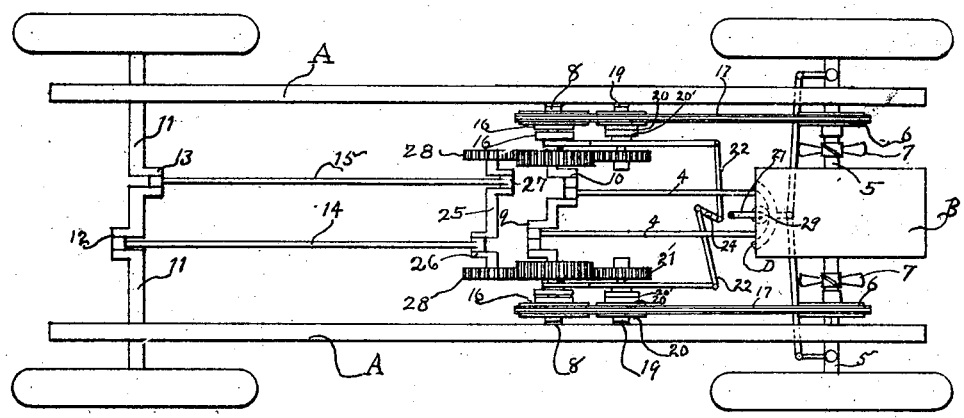
Fig. 2, is a plan view of the chassis of an automobile with my device adapted thereto.
Figure 3:
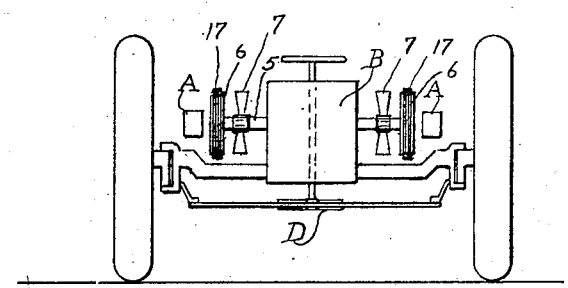
Fig. 3, is a front elevation of an automobile carrying my device.

In carrying out my invention I have shown the automobile frame A and in any convenient position, in reference to it, I have shown the battery C. In the engine body B, I provide the spark plugs 3, 3, which may be connected by wiring with the battery C. Within the engine B, I have the piston rods 4, 4, reciprocating horizontally, instead of vertically, as in the usual type of automobile power generating units. Thru the engine B, passes the shaft 5, on which I have mounted the pulleys 6, 6 and also the fans 7, 7, while journalled on the frame A, is the crank shaft 8. Shaft 8 is bent to form the crank bends 9 and 10 the piston rods 4, 4 being pivotally coupled therewith in any convenient manner. Mounted in the frame A, I also have the rear axle 11, having formed therein the crank bends 12 and 13, while mounted adjacent shaft 8 I have auxiliary shaft 25, having formed therein crank bends 26 and 27, and connecting crank bend 27 with bend 13 in shaft 11, I have connecting rod 15. In a similar manner connecting rod 14 connects crank bends 26 and 12. Shaft 8 carries sprockets 16, 16, which are connected with sprockets 6, 6 by means of chains 17, 17. Mounted loosely on shaft 8, I have the gears 18, 18, meshing with gears 21 fixed to shaft 19, mounted in frame A, in any convenient manner, and fixed to shaft 25, I provide gears 28, 28, meshing with the gears 18 on shaft 8. The hubs of sprockets 16 and 20 are divided to form clutches 16' and 20' operated by means of pivoted lever 29, connected by lever 22 to cross arm 23, mounted on upright shaft 24, the rotation of which causes the clutches to engage and disengage.

Figure 4:
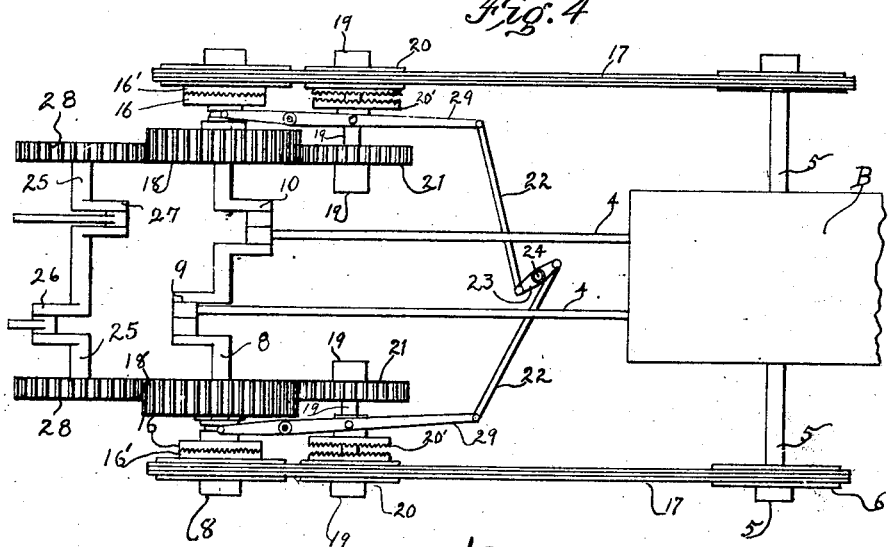
Fig. 4, is a plan view slightly enlarged of the gear shifting portion of my device.
Figure 5:
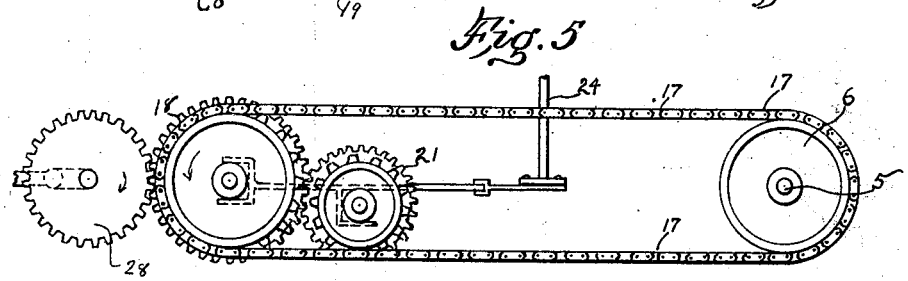
Fig. 5, is a side view of a part of my invention.

In the operation of my device, having started the motor B, thus causing piston rods 4 to reciprocate and rotate shaft 8 which does not however rotate gears 18 due to their being loosely fitted thereon, I then turn the operating shaft 24 to position shown in Fig. 4, which causes clutch 16', which is secured to shaft 8, to engage and rotate gears 18. Rotation of gears 18, through gears 28 meshing therewith, causes rotation of shaft 25 and reciprocation of rods 14 and 15 connected to rear axle 11. Gear 21 and shaft 19 of course rotate with gears 18. Sprocket 20 is loosely fitted on shaft 19. When control shaft 24 is rotated in the opposite direction, clutch 20' is engaged. Sprocket 20 now being clutched to shaft 19 and rotated by chain 17 causes shaft 19 on which is fixed gear 21 to drive gear 18, fitted loosely on shaft 8, in a direction opposite to that previously driven. Through gears 18 gears 28 are also driven in a direction the reverse of that previously followed. This of course causes the connecting rods 14 and 15 to drive the axle 11 in the opposite direction. A neutral point during which neither clutch is engaged is utilized when the operator desires to stop the car.

Having described my invention, what I claim as new and useful, and for which I desire Letters Patent is as follows:

In a power transmission means, a crank shaft driven by piston rods and carrying idler gears; clutches fixed to the idler gears; sprockets fixed to the crank shaft and driving sprocket chains; idler sprockets engaging said sprocket chains; a shaft carrying the idler sprockets; clutches capable of connecting the idler sprockets and the shaft gears secured to the shaft which continuously mesh with the aforementioned idler gears; drive gears meshing with the idler gears and fixed to a driving shaft connected to the axle of the vehicle; means to engage one set of clutches and disengage the other set simultaneously or to so neutralize the clutches that movement of the vehicle is stopped.

In testimony whereof I have affixed my signature.

LOUIS NYCZ.